United States Patent Office 3,488,334
Patented Jan. 6, 1970

3,488,334
COMPOUNDS CONTAINING VANADIUM, OXYGEN AND PHOSPHORUS, METHODS FOR MAKING SAME, AND CATALYSTS USING SAME FOR POLYMERIZATION OF UNSATURATED COMPOUNDS
John W. Bayer, Perrysburg, and William Charles Grinonneau, Toledo, Ohio, assignors to Owens-Illinois, Inc., a corporation of Ohio
No Drawing. Filed Oct. 21, 1965, Ser. No. 500,329
Int. Cl. C08f 1/42, 1/56
U.S. Cl. 260—88.2                                25 Claims

ABSTRACT OF THE DISCLOSURE

Disclosed herein is a catalyst composition, a method for making it, and a method of polymerization of unsaturated compounds; the catalyst composition contains a primary component (produced by the reaction of a vanadium oxide with an organic phosphorus oxy compound in the presence of a polar additive) which is employed in conjunction with an organo-aluminum compound as a cocatalyst.

---

This invention relates to a process for the polymerization of ethylenically unsaturated compounds. Likewise, the invention is concerned with a catalytic composition of matter and a process for the preparation of the same.

Polymerization processes and catalytic compositions of matter are widely used for the preparation of a diverse range of polymers. These polymeric compositions are widely used, for example in the packaging and construction fields. Specifically, this invention relates to a new process and catalyst system whereby desirable solid polymers can be economically produced.

An object of this invention is to provide a new polymerization process. Other objects of this invention include the development of a new polymerization catalyst and a process for the preparation of said catalyst. More specifically, an object of this invention is to provide an impoved process and catalyst system for the polymerization of monomeric compounds, such as ethylene, propylene, styrene, vinyl chloride and butadiene.

The polymerization processes and catalyst of this invention are adapted for the preparation of a wide range of polymers. This invention is applicable to the preparation of both homopolymeric and copolymeric compositions, such as (1) vinyl resins formed by the polymerization of vinyl halides or by the copolymerization of vinyl halides with unsaturated polymerizable compounds, e.g., vinyl esters, α,B-unsaturated acids, α, B-unsaturated esters, α,B-unsaturated ketones, α,B-unsaturated aldehydes and unsaturated hydrocarbons such as butadienes and styrenes; (2) poly-α-olefins such as polyethylene, polypropylene, polybutylene, polyisoprene and poly(1,3-butadiene) including copolymers of poly-α-olefins; (3) polystyrene, including copolymers of styrene with monomeric compounds such as acrylonitrile and butadiene; (4) acrylic resins as exemplified by the polymers of methyl acrylate, acrylamide, methylol acrylamide, acrylonitrile, and copolymers of these with styrene, vinyl pyridines, etc.; (5) neoprene; and (6) unsaturated polyesters. This list is not meant to be limiting or exhaustive but merely to illustrate the wide range of polymeric materials which may be obtained by the present invention. Of special interest are olefinically unsaturated hydrocarbons having at least one carbon to carbon double bond, especially those having a terminal double bond.

The process and catalyst of this invention are particularly suited to the preparation of high quality polymers and copolymers from monomers such as ethylene, propylene, styrene and vinyl chloride.

The primary catalyst of this invention is produced by the reaction of a vanadium oxide of the formula $$V_2O_n$$ 

wherein $n$ is an integer from 3 to 5, with an organic phosphorus oxy compound. Usual organic phosphorus oxy compounds have the formula

wherein $R_1$, $R_2$ and $R_3$ are independently members such as hydrogen, hydroxyl, alkyl having from one to eight carbon atoms, alkoxy having from one to eight carbon atoms and aryl, wherein at least one member is an organic group in the presence of a polar additive, which is, for example, water, an alcohol, an aldehyde, an ether, a ketone, an organic amine, an organic acid, an inorganic acid, a dioxane, a furan, or a pyridine. Examples of specific polar additives are water, methanol, ethanol, acetone, 2-propanol, n-butyl alcohol, tertiary butylalcohol, methyl ethyl ketone, dioxane, tetrahydrofuran, diethylamine, triethylamine, formic acid, acetic acid and benzene sulfonic acid.

Especially useful phosphorus compounds of the above formula are alkyl and aryl phosphonic acids.

The disclosure of U.S. application Ser. No. 465,210 filed June 18, 1965, now Patent 3,427,257, is incorporated herein by reference: Primary catalyst components made by the reaction of a vanadium oxide with the same phosphorus-containing compounds are described and claimed in said copending application. The specific method of preparing reaction products of such components in the presence of the polar additive as set forth herein produces an active catalyst in a much shorter time at the same reaction temperature than when the polar additive is not present. Further, a much more active catalyst component can be produced in the same length of reaction time.

The primary catalyst component can be prepared by the reaction of the vanadium oxide with the organic phosphorus oxy compound contacted in a weight ratio generally in the range from 1:6 to 6:1 in the presence of the polar additive, which additive is usually added in an amount not more than 6 parts by weight of the vanadium oxide nor less than 0.02 part by weight thereof. The ratio of the vanadium oxide to the phosphorus compound is usually in the range from 1:4 to 4:1.

An especially efficacious reaction system to produce an exceptionally active catalyst component is a short reaction time in the contacting of $V_2O_5$ with 3 to 5 parts by weight of benzene phosphonic acid and from about 0.05 to 3 parts by weight of a $C_1$ to $C_4$ alkanol for each part by weight of $V_2O_5$.

The primary catalyst system of this invention is produced by the reaction of the vanadium oxide with the organic phosphorus oxy compound in the presence of the polar additive, usually at temperatures from about 80 to about 200° C.

Reaction temperatures are not critical but of course affect the rate of reaction. Temperatures much below 80° C. are applicable, and temperatures as low as 40° C. can give reasonable reaction rates. Also, temperatures well above 200° C. can be employed in given instances but care must be taken not to decompose reactants, as will be understood. Usual temperatures employed are in the range from 40 to 250° C. It is difficult to specify any precise time of reaction, but the necessary time can be determined in a routine manner by testing the catalytic activity in a polymerization recipe of a series of catalyst components made using various reaction times. Generally, we have found a time of 1 to 4 hours to suffice when using reaction temperatures of 50 to 100° C., while much shorter times on the order of 1 minute or a few minutes are effective at the higher temperatures. We now prefer to effect the contacting and reaction in the presence of an inert liquid diluent or solvent, such as an aromatic, aliphatic or cycloaliphatic hydrocarbon. After reaction, the catalyst component solid can be separated from the diluent by evaporation. When benzene is the solvent the temperature of evaporation is usually 35 to 85° C., lower temperatures being used with application of vacuum. Any excess unreacted polar additive remaining after the reaction is essentially removed by the drying procedure if the additive is a volatile one. If the additive is not removed by the drying procedure, small amounts can remain in the solid catalyst component. It should be remembered, however, that it is desirable to remove any appreciable amounts of the polar additive when such additive would be reactive with the cocatalyst. Such removal is simply accomplished by washing the solid reaction product with a solvent for the polar additive, and then drying the solid product. Sufficient diluent or solvent to slurry the product primary catalyst component produced is usually present.

It is to be noted that the catalyst of this invention can also be prepared by directly reacting the vanadium oxide with the organic phosphorus oxy compound in the presence of the polar additive but in the absence of a solvent. This reaction technique is usually carried out at a temperature of from about 160 to about 200° C. but higher or lower temperatures can be used as before noted. Usual times are from about 1 minute to about 1 hour.

The above described catalytic component is utilized in conjunction with a cocatalyst which is represented by the formula:

wherein $R_1$ is a member such as alkyl having from one to eight carbon atoms and aryl;

$R_2$ is a member such as alkyl having from one to eight carbon atoms, aryl and halogen;

$R_3$ is a member such as alkyl having from one to eight carbon atoms, aryl and halogen.

Usually, the aryl group $R_1$, $R_2$ or $R_3$ (including alkaryl) has no more than 10 carbon atoms. Further, the halogen $R_1$, $R_2$, or $R_3$ is preferably Cl, Br or I.

A preferred group of cocatalysts are the trialkyl aluminums, the dialkyl aluminum halides (Cl, Br or I) and the alkyl aluminum dihalides (Cl, Br or I) where each alkyl group contains 1 to 8 carbon atoms (usually 1–4 carbon atoms). An especially useful cocatalyst is diethylaluminum chloride.

From about 1 to about 5 parts by weight of the primary catalyst can be utilized with from about 1 to about 10 parts by weight of catalyst of this invention. Expressed differently, the usual weight ratio of primary catalyst to cocatalyst is from 1:10 to 5:1. However, it will be appreciated that any amount of cocatalyst is useful with the primary catalyst of the invention, and that much higher or lower ratios can be used. In many cases, the solvent used in the polymerization may contain appreciable amounts of reactive compounds such as water, necessitating the use of a much larger ratio of cocatalyst to primary catalyst than the 10:1 ratio set out above.

Polymerization reactions utilizing the catalyst systems of this invention are carried out by the introduction of monomeric material into a reaction vessel while maintaining said reaction vessel usually at a temperature of from about −70 to about 200° C., more usually from 0 to 200° C., and maintaining the pressure usually at about atmospheric to about 2000 p.s.i.g., altogether higher pressures are applicable.

It is obvious to one skilled in the art that the optimum reaction conditions for any given monomeric compound depend on the characteristics of said monomeric compound. It is likewise obvious to one skilled in the art that a polymerization reaction utilizing the process and catalyst of this invention can be carried out on a continuous basis by continuously contacting monomeric material with a catalyst bed. Likewise, the process of this invention can be carried out on a batch basis by charging an autoclave with a fixed amount of a catalyst and a monomeric material.

The polymerization reaction according to this invention is usually carried out in the presence of a diluent or solvent such as an aromatic or an aliphatic hydrocarbon.

The polymers resulting from the polymerization processes of this invention are useful for the manufacture of a diverse range of articles such as bottles, jugs, toys, films, etc., as is well understood in the art.

The following examples will illustrate the preparation of polymers by means of the subject invention, as well as the production of the new catalyst components. These examples are given for purposes of illustration and not for purposes of limiting this invention.

Example 1

A primary catalyst components was prepared by adding 7.3 grams (0.04 moles) of vanadium pentoxide, 25.3 grams (0.16 moles) of benzene phosphonic acid, 2.56 grams of methanol and 200 ml. of benzene to a 1 liter flask which was equipped with a condenser, a mechanical stirrer and a heating mantle. The mixture was then stirred and heat was applied until a reflux temperature of 80° C. was achieved. This temperature was maintained for three hours. The reaction mixture swelled, whereupon the heating was terminated. The reaction mixture was then dried by the addition of a vacuum and drying heat of about 50° C., for 12 hours.

0.5 gram of this catalyst was then added to 300 ml. of n-heptane in a 1 liter flask along with 0.5 ml. of diethylaluminum chloride. The system was closed to the atmosphere and flushed with nitrogen. The nitrogen was then removed and ethylene was introduced at 20 p.s.i.g.

The temperature was raised to 57° C. and the polymerization was allowed to proceed for two hours with the continual addition of ethylene. At the end of this time, the reaction was terminated and the polymer was collected and purified by drying in a vacuum for 12 hours at 60–70° C. A yield of 78.0 grams of polyethylene was achieved.

Similar results are obtained when the primary catalyst component used is made as before but using 6.6 grams of $V_2O_4$ instead of 7.3 grams of $V_2O_5$.

Example 2

With the catalyst of Example 1, a copolymer of ethylene and propylene was produced in accordance with the following, 0.5 gram of the catalyst of Example 1, 0.5 ml. of diethylaluminum chloride and 300 ml. of heptane were added to the polymerization flask of Example 1. Propylene was then added at a pressure of 22 p.s.i.g. for 7 minutes. The propylene was then removed from the flask and ethylene introduced at a pressure of 22 p.s.i.g. This procedure was repeated every ½ hour during the polymerization sequence. A temperature of 57° C. was maintained. At the end of 2 hours, the polymerization reaction was terminated, the copolymer removed and treated as per the description of Example 1. 11.0 grams of ethylene-propylene rubber was obtained. The product copolymer had an infrared spectrum which was essentually identical with that of a known ethylene-propylene copolymer standard.

Example 3

To a three liter autoclave was added 1½ liters of n-pentane along with 0.05 gram of the catalyst as prepared by the preparatory technique of Example 1, 0.26 gram of diethylaluminum chloride cocatalyst was also added. The system was pressured to 100 p.s.i.g. with ethylene and the temperature raised to 57° C. Polymerization reaction was allowed to proceed for two hours. A yield of 18.5 grams of polyethylene was obtained after purification in accordance with the description in Example 1.

Example 4

The autoclave of Example 3 was charged with 0.05 gram of the catalyst of Example 1, 1½ liters of n-heptane, and 0.26 gram of diethylaluminum chloride cocatalyst. Ethylene was then introduced in the autoclave at a pressure of 300 p.s.i.g. The ethylene pressure of the autoclave was raised to 400 p.s.i.g. and the temperature raised to 57° C. The polymerization reaction was allowed to proceed for two hours. With purification as described in Example 1, a yield of 105 grams of polyethylene was obtained.

Example 5

A three liter autoclave was charged with 1½ liters of n-pentane, 0.1 gram of the catalyst as described in Example 1 and 1.32 grams of diethylaluminum chloride cocatalyst. Ethylene was then introduced at a pressure of 200 p.s.i.g. and the temperature was raised to 100° C. The polymerization reaction was allowed to proceed for two hours. After purification in accordance with the procedure of Example 1, 140 grams of polyethylene was obtained.

Example 6

A three liter autoclave as discussed in Example 3 was filled with 1½ liters of n-heptane, 0.1 gram of the catalyst as described in Example 1, and 0.52 gram of diethylaluminum chloride cocatalyst. The ethylene pressure was raised to 450 p.s.i.g. and the temperature raised to 100° C. The polymerization reaction was allowed to proceed for two hours. After purification in accordance with the description of Example 1, 150 grams of polyethylene was obtained.

Example 7

A catalyst was prepared in accordance with the description of Example 1, (except that the polar additive was omitted), by the reaction of 7.3 grams (0.04 mole) of vanadium pentoxide and 25.3 grams (0.16 moles) of benzene phosphonic acid. After the three hour reaction period, the mixture was evaporated at 71° C. under vacuum. Then 0.5 gram of the resulting catalyst was utilized in conjunction with 0.5 ml. of diethylaluminum chloride to polymerize ethylene as per the polymerization description given in Example 1, 0.3 gram of polyethylene resulted.

Example 8

Using the procedure as described in Example 1, a catalyst was prepared by reacting 7.3 grams (0.04 mole) of vanadium pentoxide and 25.3 grams (0.16 moles) of benzene phosphonic acid in the presence of 0.04 mole of water. Using the polymerization technique as described in Example 1, except that butadiene was used as a monomer, 3.0 grams of polybutadiene resulted.

Example 9

With the preparatory procedure as described in Example 1, a catalyst was prepared by the treatment of 0.04 mole of vanadium pentoxide with 0.04 mole of methanol. 0.5 gram of this catalyst was then combined with 0.5 ml. of diethylaluminum chloride.

The polymerization of ethylene was then attempted according to the procedure of Example 1. However, due to the fact that a phosphorus compound was not utilized in the catalyst, no polymer resulted.

Example 10

The catalyst of Example 1, was prepared except that the benzene reaction solvent was replaced with 100 ml. of water. This water also functioned as a polar additive. 0.5 gram of this catalyst was used in conjunction with 0.5 ml. of diethylaluminum chloride. A polymerization reaction was then carried out in accordance with the description given in Example 1. 1.2 grams of polyethylene resulted.

Example 11

A mixture of 7.3 grams $V_2O_5$ (0.04 mole), 2.53 grams benzene phosphonic acid (0.16 mole) and 200 ml. benzene were heated to reflux. At this point anhydrous HCl gas was slowly bubbled into the refluxing mixture. The HCl addition was continued for two hours and then stopped. The catalyst mixture was allowed to reflux for one additional hour. The mixture was then vacuum dried, with the yellow solid saved as catalyst. To 300 ml. heptane was added 0.5 gram of the above catalyst, and 0.5 ml. of diethylaluminum chloride. The reactor was pressured with ethylene to 20 p.s.i.g., and maintained at 57° C. for two hours. After polymer workup, 4.0 grams of solid polyethylene resulted.

Example 12

A mixture of 7.3 grams (0.04 mole) $V_2O_5$, 31.0 grams (0.16 mole) dibutyl phosphite, 2.56 grams (0.08 mole) methanol, and 200 ml. benzene were heated at reflux for three hours. Refluxing was discontinued and vacuum applied maintaining a low heat. An olive green catalytic paste resulted.

The reactor of Example 1, was charged with 300 ml. heptane, 0.5 gram of the above catalyst and 0.5 ml. of diethylaluminum chloride. The reactor was sealed and pressured with ethylene to 20 p.s.i.g. This pressure was maintained for two hours at 57° C. Following polymer workup, 4.3 grams of solid polyethylene resulted.

Example 13

A mixture of 7.3 grams (0.04 mole) $V_2O_5$, 54.7 grams (0.16 mole) dioctyl hydrogen phosphate, 2.56 grams (0.08 mole) methanol, and 200 ml. benzene were heated at reflux for three hours. Refluxing was discontinued and vacuum applied maintaining a low heat. A yellow green catalytic slurry resulted.

The reactor of Example 1 was charged with 300 ml. heptane, 0.5 gram of the above catalytic slurry, and 0.5 ml. diethylaluminum chloride. The reactor was sealed and pressured with ethylene to 20 p.s.i.g. The pressure was maintained for two hours at 57° C. Following polymer workup, 14.5 grams of solid polyethylene resulted.

Similar results are obtained when either 50 grams of octyl acid phosphate or 26 grams of diethyl ethyl phosphonate are substituted for the dioctyl hydrogen phosphate used in making the primary catalyst component as above described.

Examples 14–38

The data for these examples are listed in Tables I and II. Ethylene was polymerized according to the procedure and conditions as described in Example I. In all cases the catalyst was prepared by the reaction of 0.04 mole of vanadium pentoxide and 0.16 moles of benzene phosphonic acid and an additive as specified in accordance with Example 1. The polymerization reaction was carried out in the presence of 200 ml. of benzene. It can be seen that the additive and the amount of said additive has a marked influence on the yield of polyethylene.

TABLE I.—POLYMERIZATION OF C₂H₄ WITH VOP-ADDITIVE SYSTEMS

| Example No. | Additive | Amount, Moles | Catalyst (gm.) | Cocatalyst (ml.) | Polyethylene Yield (gms.) |
|---|---|---|---|---|---|
| 14 | Water | 0.2 | 0.5 | DEAC, 0.5 | 7.9 |
| 15 | do | 0.04 | 0.5 | DEAC, 0.5 | 48.5 |
| 16 | do | 0.08 | 0.5 | DEAC, 0.5 | 56.2 |
| 17 | do | 0.4 | 0.5 | TEAL, 0.5 | 2.5 |
| 18 | do | 0.4 | 0.5 | DEAC, 0.5 | 11.5 |
| 19 | Methanol | 0.08 | 0.5 | TEAL, 0.5 | 9.5 |
| 20 | do | 0.08 | 0.5 | DEAC, 0.5 | 78.0 |
| 21 | 2-propanol | 0.08 | 0.5 | TEAL, 0.5 | 9.3 |
| 22 | do | 0.08 | 0.5 | DEAC, 0.5 | 52.0 |
| 23 | Tertiary-butylalcohol | 0.08 | 0.5 | DEAC, 0.5 | 30.3 |
| 24 | Methanol | 0.04 | 0.5 | DEAC, 0.5 | 23.0 |
| 25 | do | 0.02 | 0.5 | DEAC, 0.5 | 29.2 |
| 26 | Dioxane | 0.08 | 0.5 | DEAC, 0.5 | 31.1 |
| 27 | Tetrahydrofuran | 0.08 | 0.5 | DEAC, 0.5 | 11.1 |

TABLE II.—POLYMERIZATION OF C₂H₄ WITH VOP-ADDITIVE SYSTEMS

| Example No. | Additive | Amount, Moles | Catalyst (gm.) | Cocatalyst (ml.) | Polyethylene Yield (gms.) |
|---|---|---|---|---|---|
| 28 | Diethylamine | 0.02 | 0.5 | DEAC, 0.5 | 2.2 |
| 29 | Tritehyl amine | 0.08 | 0.5 | DEAC, 0.5 | 13.6 |
| 30 | do | 0.02 | 0.5 | DEAC, 0.5 | 4.0 |
| 31 | Benzene sulfonic acid | 0.02 | 0.5 | DEAC, 0.5 | 75.0 |
| 32 | Acetone | 0.08 | 0.5 | DEAC, 0.5 | 10.2 |
| 33 | Acetic acid | 0.08 | 0.5 | DEAC, 0.5 | 24.8 |
| 34 | do | 0.02 | 0.5 | DEAC, 0.5 | 49.0 |
| 35 | Methyl ethyl ketone | 0.08 | 0.5 | DEAC, 0.5 | 3.1 |
| 36 | Diethyl ether | 0.08 | 0.5 | DEAC, 0.5 | 20.2 |
| 37 | Formic acid | 0.08 | 0.5 | DEAC, 0.5 | 63.0 |
| 38 | do | 0.02M | 0.5 | DEAC, 0.5 | 38.0 |

NOTE.—DEAC=Diethylalumiuum chloride; TEAL=Triethylaluminum chloride.

Especially useful polar additives of the invention are benzene sulfonic acid, $C_1$ to $C_4$ alkanols, water and $C_1$ to $C_4$ carboxylic acids.

As will be evident to those skilled in the art, modifications of this invention can be made or followed in the light of the foregoing disclosure without departing from the spirit and scope of the disclosure or from the scope of the claims.

What is claimed is:

1. A process for the polymerization of an ethylenically unsaturated compound to produce a solid polymer which comprises contacting the unsaturated compound with a catalytic amount of a catalytic composition comprising (1) a primary catalyst that is produced by the reaction at a temperature in the range from 40 to 250° C. of a vanadium oxide represented by the formula $$V_2O_n$$

wherein $n$ is an integer from 3 to 5, and an organic phosphorus compound represented by the formula

wherein $R_1$, $R_2$ and $R_3$ are independently hydrogen, hydroxyl, alkyl having from one to eight carbon atoms, alkoxy having from one to eight carbon atoms or aryl, wherein at least one member is an organic group, wherein the weight ratio of the vanadium oxide to the phosphorus compound is in the range from 1:6 to 6:1, in the presence of a polar additive which is an alcohol, an aldehyde, an ether, a ketone, an organic amine, an organic acid, an inorganic acid, or a pyridine, and (2) a cocatalyst represent by the formula

wherein $R_1$ is alkyl having from one to eight carbon atoms or aryl:

$R_2$ is alkyl having from one to eight carbon atoms, aryl or halogen:

$R_3$ is alkyl having from one to eight carbon atoms, aryl or halogen, wherein the weight ratio of (2) to (1) is at least 1:5 and the weight ratio of the polar additive to $V_2O_n$ is in the range from 0.02 to 6.

2. The process of claim 1 wherein the unsaturated compound is vinyl chloride.

3. A process of claim 1 wherein said ethylenically unsaturated compound is a hydrocarbon having at least one terminal carbon-to-carbon double bond.

4. A process of claim 1 wherein said unsaturated compound comprises ethylene.

5. A process of claim 1 wherein said unsaturated compound is 1,3-butadiene.

6. A process of claim 1 wherein said unsaturated compound is an olefinically unsaturated hydrocarbon having at least one terminal double bond.

7. A process of claim 1 wherein a copolymer of ethylene and propylene is produced by copolymerizing these olefins.

8. A process for the polymerization of an ethylenically unsaturated compound to produce a solid polymer which comprises contacting the unsaturated compound with a catalytic amount of a catalytic composition comprising (1) a primary catalyst that is produced by the reaction at a temperature in the range from 40 to 250° C. of a vanadium oxide represented by the formula $$V_2O_n$$

wherein $n$ is an integer from 3 to 5, and an organic phosphorous compound represented by the formula

wherein $R_1$, $R_2$ and $R_3$ are independently hydrogen, hydroxyl, alkyl having from one to eight carbon atoms, alkoxy having from one to eight carbon atoms or aryl, wherein at least one member is an organic group, wherein the weight ratio of the vanadium oxide to the phosphorus compound is in the range from 1:6 to 6:1, in the presence of a polar additive which is an alcohol, an aldehyde, an ether, a ketone, an organic amine, an organic acid, an inorganic acid, or a pyridine, and (2) a cocatalyst selected from the group consisting of a trialkyl aluminum, a dialkylaluminum halide, and an alkyl aluminum dihalide wherein the halogen is Cl, Br or I and each alkyl contains one to eight carbon atoms, wherein the weight ratio of (2) to (1) is at least 1:5 and the weight ratio of the polar additive to $V_2O_n$ is in the range from 0.02 to 6.

9. A process for the preparation of solid polyethylene which comprises contacting ethylene with a catalytic amount of a catalyst consisting essentially of (1) a primary catalyst which is produced by the reaction at a temperature in the range from 40 to 250° C., in the presence of methanol, of vanadium pentoxide with phenyl phosphonic acid, wherein the weight ratio of the vanadium oxide to the phosphorus compound is in the range from 1:6 to 6:1, and (2) diethylaluminum chloride cocatalyst, wherein the weight ratio of (2) to (1) is at least 1:5 and the weight ratio of methanol to vanadium pentoxide is in the range from 0.02 to 6.

10. A process for the preparation of a solid ethylene-propylene copolymer with a catalytic amount of a catalytic composition consisting essentially of (1) a primary catalyst which is produced by the reaction, at a temperature in the range from 40 to 250° C., in the presence of methanol, of vanadium pentoxide with phenyl phosphonic acid, wherein the weight ratio of the vanadium oxide to the phosphorus compound is in the range from 1:6 to 6:1, and (2) diethylaluminum chloride cocatalyst, wherein the weight ratio of (2) to (1) is at least 1:5 and the weight ratio of methanol to vanadium pentoxide is in the range fom 0.02 to 6.

11. A process for the preparation of solid poly(1,3-butadiene) which comprises contacting 1,3-butadiene with a catalyst amount of a catalytic composition consisting essentially of (1) a primary catalyst which is produced by the reaction at a temperature in the range from 40 to 250° C. in the presence of methanol, of vanadium pentoxide with phenyl phosphonic acid, wherein the weight ratio of the vanadium oxide to the phosphorous compound is in the range from 1:6 to 6:1, and (2) diethylaluminum chloride cocatalyst, wherein the weight ratio of (2) to (1) is at least 1:15 and the weight ratio of methanol to vanadium pentoxide is in the range from 0.02 to 6.

12. A process for the preparation of a catalytic component which comprises reacting at a temperature in the range from 40 to 250° C. a vanadium oxide having the formula $V_2O_n$ wherein $n$ is an integer from 3 to 5 with a compound of the formula

wherein
$R_1$, $R_2$ and $R_3$ are independently hydrogen, hydroxyl, alkyl having from one to eight carbon atoms, alkoxy having from one to eight carbon atoms or aryl, wherein at least one member is an organic group, wherein the weight ratio of the canadium oxide to the phosphorous compound is in the range from 1:6 to 6:1, in the presence of a polar additive which is an alcohol, an aldehyde, an ether, a ketone, an organic amine, an organic acid, an inorganic acid, or a pyridine wherein the weight ratio of the polar additive to $V_2O_n$ is in the range from 0.02 to 6.

13. A process for the preparation of a catalytic component which comprises reacting at a temperature in the range from 40 to 250° C. a vanadium compound represented by the formula $$V_2O_n$$

wherein $n$ is an integer from 3 to 5, and an organic phosphorus oxy compound represented by the formula

wherein
$R_1$, $R_2$ and $R_3$ are independently hydrogen, hydroxyl, alkyl having from one to eight carbon atoms, alkoxy having from one to eight carbon atoms, or aryl, wherein at least one member is an organic group, wherein the weight ratio of the vanadium oxide to the phosphorous compound is in the range from 1:6 to 6:1, by contacting intimately these reactants in the presence of a polar additive which is an alcohol, an aldehyde, an ether, a ketone, an organic amine, an organic acid, an inorganic acid, or a pyridine, wherein the weight ratio of the polar additive to the $V_2O_n$ is in the range from 0.02 to 6.

14. A process of claim 13 wherein said $V_2O_n$, said phosphorus compound and said polar additive are in intimate admixture with an inert liquid diluent during said process.

15. A process of claim 13 wherein said phosphorus compound is an aryl phosphonic acid.

16. A process of claim 13 wherein said phosphorus compound is an alkyl phosphonic acid.

17. A process of claim 13 wherein said phosphorus compound is a phenyl phosphoric acid.

18. A process of claim 13 wherein said polar additive is an alkanol having 1 to 4 carbon atoms.

19. A process of claim 13 wherein said polar additive is benzene sulfonic acid.

20. A process of claim 13 wherein said polar additive is a $C_1$ to $C_4$ carboxylic acid.

21. A process for the preparation of a composition of matter which comprises reacting at a temperature in the range from 40 to 250° C. vanadium pentoxide with phenyl phosphonic acid, wherein the weight ratio of the vanadium oxide to the phosphorous compound is in the range from 1:6 to 6:1, in the presence of methanol and an inert organic diluent, wherein the weight ratio of methanol to vanadium pentoxide is in the range from 0.02 to 6.

22. A catalytic composition of matter comprising (1) the product of the reaction at a temperature in the range from 40 to 250° C. of a vanadium oxide represented by the formula, $$V_2O_n$$

wherein $n$ is an integer from 3 to 5, and an organic phosphorus oxy compound represented by the formula

wherein
$R_1$, $R_2$ and $R_3$ are independently hydrogen, hydroxyl, alkyl having from one to eight carbon atoms, alkoxy having from one to eight carbon atoms or aryl, wherein at least one member is an organic group, wherein the weight ratio of the vanadium oxide to the phosphorous compound is in the range from 1:6 to 6:1, in the presence of a polar additive which is an alcohol, an aldehyde, an ether, a ketone, an organic amine, an organic acid, an inorganic acid, or a pyridine, and (2) a cocatalyst selected from the group consisting of

wherein
$R_1$ is alkyl having from one to eight carbon atoms or aryl;
$R_2$ is alkyl having from one to eight carbon atoms, aryl or halogen;

$R_3$ is alkyl having from one to eight carbon atoms, aryl or halogen,
wherein the weight ratio of (2) to (1) is at least 1:5 and the weight ratio of the polar additive to $V_2O_n$ is in the range from 0.02 to 6.

23. A catalytic composition of matter comprising (1) the product of the reaction at a temperature in the range from 40 to 250° C. of a vanadium oxide represented by the formula $$V_2O_n$$

wherein $n$ is an integer from 3 to 5, and an organic phosphorous oxy compound represented by the formula $$R_2-\underset{\underset{R_3}{|}}{\overset{\overset{R_1}{|}}{P}}=O$$

wherein
$R_1$, $R_2$ and $R_3$ are independently hydrogen, hydroxyl, alkyl having from one to eight carbon atoms, alkoxy having from one to eight carbon atoms or aryl, wherein at least one member is an organic group, wherein the weight ratio of the vanadium oxide to the phosphorus compound is in the range from 1:6 to 6:1, in the presence of a polar additive which is an alcohol, an aldehyde, an ether, a ketone, an organic amine, an organic acid, an inorganic acid or a pyridine, and (2) a cocatalyst selected from the group consisting of a trialkyl aluminum, a diakylaluminum halide, and an alkyl aluminum dihalide wherein the halogen is Cl, Br or I and each alkyl contains one to eight carbon atoms, wherein the weight ratio of (2) to (1) is at least 1:5 and the weight ratio of the polar additive to $V_2O_n$ is in the range from 0.02 to 6.

24. A catalytic composition of matter comprising (1) the product of the reaction at a temperature in the range from 40 to 250° C. of vanadium pentoxide and phenyl phosphonic acid, wherein the weight ratio of the vanadium oxide to the phosphorus compound is in the range from 1:6 to 6:1, in the presence of methanol and (2) diethylaluminum chloride cocatalyst, wherein the weight ratio of (2) to (1) is at least 1:5 and the weight ratio of methanol to vanadium pentoxide is in the range from 0.02 to 6.

25. The reaction product obtained by intimately contacting at a temperature in the range from 40 to 250° C. a vanadium oxide represented by the formula $$V_2O_n$$

wherein $n$ is an integer from 3 to 5, and an organic phosphorus oxy compound represented by the formula $$R_2-\underset{\underset{R_3}{|}}{\overset{\overset{R_1}{|}}{P}}=O$$

wherein
$R_1$, $R_2$ and $R_3$ are independently hydrogen, hydroxyl, alkyl having from one to eight carbon atoms, alkoxy having from one to eight carbon atoms or aryl, wherein at least one member is an organic group, wherein the weight ratio of the vanadium oxide to the phosphorus compound is in the range from 1:6 to 6:1 in the presence of a polar additive which is an alcohol, an aldehyde, an ether, a ketone, an organic amine, an organic acid, an inorganic acid, or a pyridine and the weight ratio of methanol to vanadium pentoxide is in the range from 0.02 to 6.

References Cited

UNITED STATES PATENTS 3,112,297  11/1963  Gordon et al. _____ 260—88.2
3,427,257   2/1969  Bayer et al. _____ 252—431

JOSEPH L. SCHOFER, Primary Examiner

EDWARD J. SMITH, Assistant Examiner

U.S. Cl. X.R.

252—430, 437; 260—82.1, 84.1, 85.5, 86.1, 86.3, 87.5, 89.7, 92.8, 93.5, 93.7, 94.3, 94.9

PO-1050
(5/69)

UNITED STATES PATENT OFFICE
CERTIFICATE OF CORRECTION

Patent No. 3,488,334                    Dated  January 6, 1970

Inventor(s) John W. Bayer and William C. Grinonneau

It is certified that error appears in the above-identified patent and that said Letters Patent are hereby corrected as shown below:

Column 6, 17, delete "2.53" and insert therefor --25.3--;

Column 9, line 44 delete "1:15" and insert therefor --1:5--;

SIGNED AND
SEALED
JUN 23 1970

(SEAL)
Attest:

Edward M. Fletcher, Jr.
Attesting Officer

WILLIAM E. SCHUYLER, JR.
Commissioner of Patents